US012615668B2

(12) United States Patent
Dai et al.

(10) Patent No.: US 12,615,668 B2
(45) Date of Patent: Apr. 28, 2026

(54) METHOD AND APPARATUS FOR RANDOM ACCESS PROCEDURE

(71) Applicant: ZTE Corporation, Shenzhen (CN)

(72) Inventors: Jianqiang Dai, Shenzhen (CN); Li Tian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 496 days.

(21) Appl. No.: 17/504,119

(22) Filed: Oct. 18, 2021

(65) Prior Publication Data

US 2022/0039174 A1     Feb. 3, 2022

Related U.S. Application Data

(63) Continuation of application No. PCT/CN2019/083288, filed on Apr. 18, 2019.

(51) Int. Cl.
*H04W 72/04* (2023.01)
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ........... H04W 74/0833; H04W 74/004; H04W 74/006; H04W 72/1268; H04W 72/23; H04L 5/0048
See application file for complete search history.

(56) References Cited

U.S. PATENT DOCUMENTS

| | | | | |
|---|---|---|---|---|
| 12,052,770 | B2 * | 7/2024 | Chai ..................... | H04L 5/0094 |
| 2020/0245373 | A1 * | 7/2020 | Xiong .............. | H04W 74/0833 |
| 2020/0267774 | A1 * | 8/2020 | Vos ........................ | H04L 5/0048 |
| 2021/0051672 | A1 * | 2/2021 | Rastegardoost .... | H04W 74/006 |
| 2021/0185734 | A1 * | 6/2021 | Li ..................... | H04W 74/0808 |
| 2021/0345420 | A1 * | 11/2021 | Chen ................. | H04W 74/0833 |

(Continued)

FOREIGN PATENT DOCUMENTS

| | | |
|---|---|---|
| CN | 101340725 B | 7/2012 |
| CN | 106576341 A | 4/2017 |

(Continued)

OTHER PUBLICATIONS

Fujitsu, R1-1904584, Discussion on channel structure for Two-Step RACH, 3GPP TSG RAN WG1 #96bis, Xi'an, China, Apr. 8-12, 2019 (Year: 2019).*

(Continued)

*Primary Examiner* — Mahbubul Bar Chowdhury
(74) *Attorney, Agent, or Firm* — Crowell & Moring LLP

(57) ABSTRACT

A random access procedure, performed by a network device, includes selecting one of a plurality of preamble indexes of a first resource, and at least one set of the plurality of preamble indexes is mapped to at least one second resource based on a first number of the at least one set of the plurality of preamble indexes and a second number of the at least one second resource. A first message is transmitted to a network node, the first message including a preamble at the selected preamble index of the first resource and a payload in the second resource associated to the selected preamble index. A second message is received from the network node in response to a first message.

12 Claims, 10 Drawing Sheets

(56) References Cited

U.S. PATENT DOCUMENTS

| | | | | |
|---|---|---|---|---|
| 2021/0345427 A1* | 11/2021 | Chen | ................. | H04W 74/0833 |
| 2021/0378030 A1* | 12/2021 | Wu | ................... | H04W 74/0833 |
| 2021/0385038 A1* | 12/2021 | Gao | ................. | H04L 27/26035 |
| 2022/0022268 A1* | 1/2022 | Shen | ..................... | H04L 5/0053 |
| 2022/0124816 A1* | 4/2022 | Farag | ................... | H04L 5/0051 |
| 2022/0150956 A1* | 5/2022 | Xiong | .............. | H04W 74/0833 |
| 2022/0150982 A1* | 5/2022 | Lee | ................... | H04W 74/0833 |
| 2022/0173856 A1* | 6/2022 | Ko | ........................ | H04L 5/0048 |
| 2022/0174744 A1* | 6/2022 | Lin | ................... | H04W 74/0833 |
| 2022/0174750 A1* | 6/2022 | Ohara | .................. | H04W 72/02 |
| 2022/0191937 A1* | 6/2022 | Lei | ........................ | H04L 5/0044 |
| 2022/0191944 A1* | 6/2022 | Reial | .................. | H04W 74/008 |
| 2023/0217504 A1* | 7/2023 | Xiong | .................. | H04L 5/0053 |
| | | | | 370/329 |

FOREIGN PATENT DOCUMENTS

| | | | |
|---|---|---|---|
| CN | 107690766 A | 2/2018 | |
| CN | 108934082 A | 12/2018 | |
| EP | 3 952 583 A1 | 2/2022 | |
| RU | 2681357 C2 | 3/2019 | |
| WO | WO 2018/175705 A1 | 9/2018 | |

OTHER PUBLICATIONS

Extended European Search Report received for Application No. EP 19924782.6 mailed Oct. 12, 2022 (15 pages).

3GPP TSG RAN WG1 #96bis, RI-1904584, "Discussion on Channel Structure for Two-Step RACH," Source: Fujitsu, Agenda Item: 7.2.1.1, Xi'an China, Apr. 8-12, 2019 (5 pages).

3GPP TSG RAN WG1 #96bis, RI-1901626, "Considerations on the Channel Structure of msgA," Source: ZTE, Sanechips, Agenda Item: 7.2.1.1, Athens, Greece, Feb. 25-Mar. 1, 2019 (5 pages).

3GPP TSG RAN WG1 #96bis, RI-1904542, "Discussion on Channel Structure for Two-Step RACH," Source: CATT, Agenda Item: 7.2.1.1, Xi'an China, Apr. 8-12, 2019 (5 pages).

3GPP TSG RAN WG1 #96bis, RI-1904059, "Discussion on Channel Structure for Two-Step RACH," Source: vivo, Agenda Item: 7.2.1.1, Xi'an China, Apr. 8-12, 2019 (10 pages).

3GPP TSG RAN WG1 #96bis, RI-1902135, "On 2-Step RACH Channel Structure," Source: Nokia, Nokia Shanghai Bell, Agenda Item: 7.2.1.1, Athens, Greece, Feb. 25-Mar. 1, 2019 (8 pages).

3GPP TSG RAN WG1 #96bis, RI-1904724, "Discussion on Channel Structure for Two-Step RACH," Source: CMCC, Agenda Item: 7.2.1.1, Xi'an China, Apr. 8-12, 2019 (5 pages).

International Search Report received for Application No. PCT/CN2019/083288 mailed Jan. 10, 2020 (2 pages).

Office Action from the Russia Patent Office dated Oct. 17, 2022 for Application No. RU 2021133373/07 (13 pages).

Search Report from the Russia Patent Office dated Oct. 17, 2022 for Application No. RU 2021133373/07 (4 pages).

Intel Corporation, Channel Structure for Two-Step RACH, 3GPP TSG RAN WG1 #96 (R1-1902466), Athens, Greece, Feb. 16, 2019, (found Oct. 17, 2022), online.

Notification of the Second Office Action dated Apr. 28, 2023 for China Patent Application No. CN 2022110062831 (English and Chinese languages) (11 pages).

Notification of the First Office Action dated Feb. 10, 2023 for China Patent Application No. CN 2022110062831 (English and Chinese languages) (19 pages).

3GPP TSG_RAN\WG1_rl1, tsgr1_96b, ZTE, Sanechips, R1-1903878 "On the Channel Structure of msgA," Mar. 30, 2019 (10 pp.).

3GPP TSG_RAN\WG1_rl1, tsgr1_96b, Intel Corporation, R1-1904281 "Procedure for 2-step RACH," Mar. 30, 2019 (5 pp.).

Office Action for Canada Patent Application No. 3,133,911 dated Dec. 31, 2024 (5 pages).

First Office Action for Korea Patent Application No. 10-2021-7037555 dated Dec. 13, 2024 (no English translation) (6 pages).

Communication for EP Patent Application No. 19 924 782.6 dated Oct. 4, 2024 (9 pages).

Office Action issued for the EP Patent Application No. 19 924 782.6 dated Mar. 11, 2025 (6 pages).

Notice of Allowance of Patent issued for Korea Patent Application No. 10-2021-7037555 dated Aug. 19, 2025 (English translation, 1 pg.).

* cited by examiner

Figures 1, 2A:
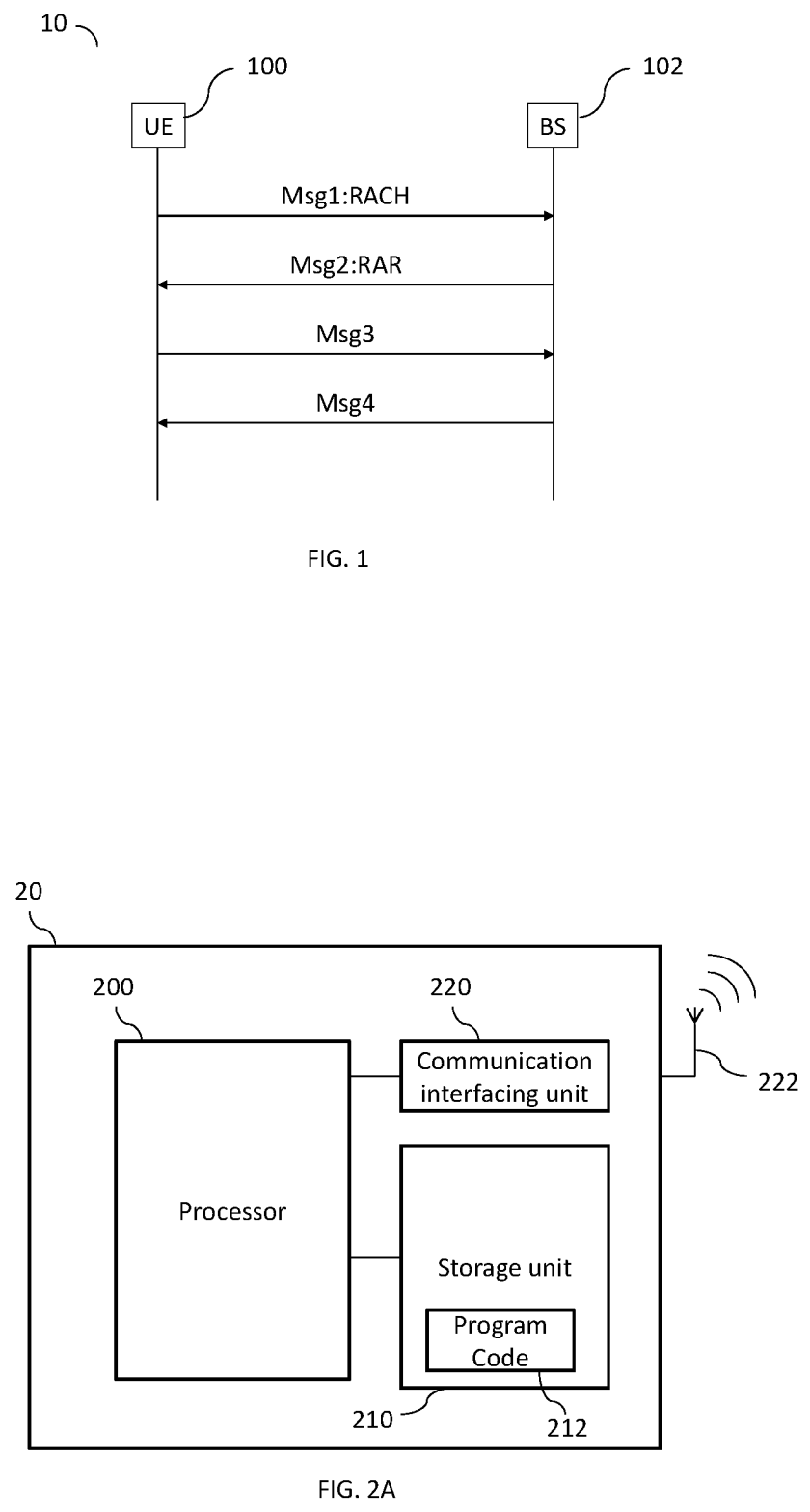

10

100
UE

102
BS

Msg1:RACH

Msg2:RAR

Msg3

Msg4

200
Processor

220
Communication interfacing unit

222

210
Storage unit

212
Program Code

Preamble index 0
Preamble index 1
Preamble index 2 → PUSCH occasion 0
Preamble index 3

⋮                          ⋮

Preamble index M-2 → PUSCH occasion N-1
Preamble index M-1

Preamble index 0 ⟶ DMRS port index 0
Preamble index 1 ⟶ DMRS port index 1
Preamble index 2 ⟶ DMRS port index 2
Preamble index 3 ⟶ DMRS port index 3

⋮                          ⋮

Preamble index M-2 ⟶ DMRS port index K-2
Preamble index M-1 ⟶ DMRS port index K-1

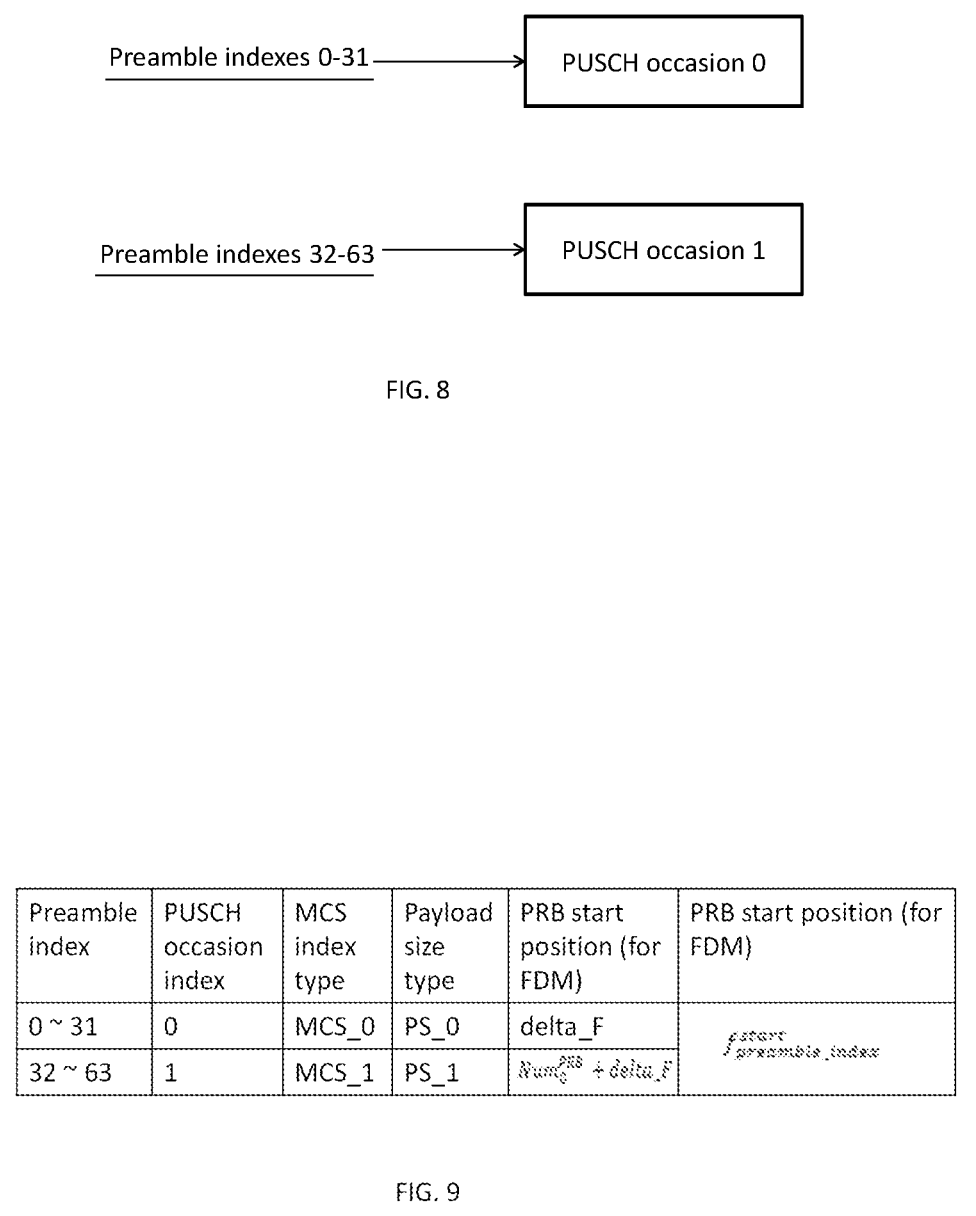

Preamble indexes 0-31 ⟶ PUSCH occasion 0

Preamble indexes 32-63 ⟶ PUSCH occasion 1

FIG. 8

| Preamble index | PUSCH occasion index | MCS index type | Payload size type | PRB start position (for FDM) | PRB start position (for FDM) |
|---|---|---|---|---|---|
| 0 ~ 31 | 0 | MCS_0 | PS_0 | delta_F | $f_{start}$ $_{preamble\_index}$ |
| 32 ~ 63 | 1 | MCS_1 | PS_1 | $Num_0^{PRB} + delta\_F$ | |

FIG. 9

Preamble indexes 0~15 ⟶ | PUSCH occasion 0

Preamble indexes 16~31 ⟶ | PUSCH occasion 1

Preamble indexes 32~47 ⟶ | PUSCH occasion 2

Preamble indexes 48~63 ⟶ | PUSCH occasion 3

FIG. 10

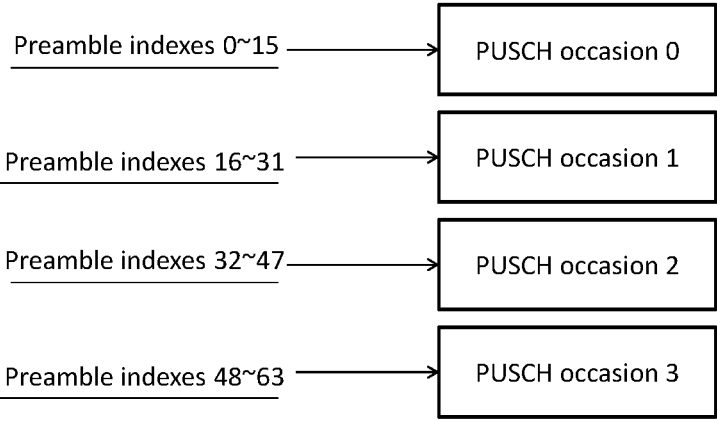

| Preamble index | PUSCH occasion index | MCS index type | Payload size type | PRB start position (for FDM) | PRB start position (for FDM) |
|---|---|---|---|---|---|
| 0 ~ 15 | 0 | MCS_0 | PS_0 | delta_F | |
| 16 ~ 31 | 1 | MCS_1 | PS_1 | $Num_0^{PRB} + delta\_F$ | |
| 32 ~ 47 | 2 | MCS_2 | PS_2 | $\sum_{i=0}^{1} Num_i^{PRB} + delta\_F$ | $f_{preamble\_index}^{start}$ |
| 48 ~ 63 | 3 | MCS_3 | PS_3 | $\sum_{i=0}^{2} Num_i^{PRB} + delta\_F$ | |

FIG. 11

Preamble indexes 0~15

Preamble indexes 16~31

Preamble indexes 32~47

Preamble indexes 48~63

PUSCH occasion 0

PUSCH occasion 1

FIG. 12

| Preamble index | PUSCH occasion index | MCS index type | Payload size type | PRB start position (for FDM) | PRB start position (for FDM) |
|---|---|---|---|---|---|
| 0 ~ 15 | 0 | MCS_0 | PS_0 | delta_F | $f^{start}_{preamble\_index}$ |
| 16 ~ 31 | 0 | MCS_0 | PS_0 | | |
| 32 ~ 47 | 0 | MCS_0 | PS_0 | | |
| 48 ~ 63 | 1 | MCS_1 | PS_1 | $Num^{PRB}_0 + delta\_F$ | |

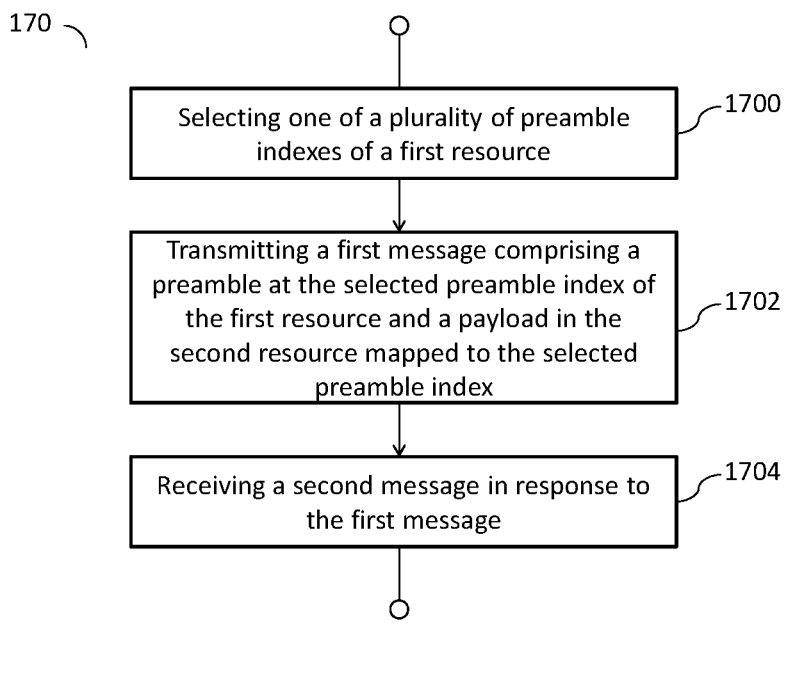

Selecting one of a plurality of preamble indexes of a first resource — 1700

Transmitting a first message comprising a preamble at the selected preamble index of the first resource and a payload in the second resource mapped to the selected preamble index — 1702

Receiving a second message in response to the first message — 1704

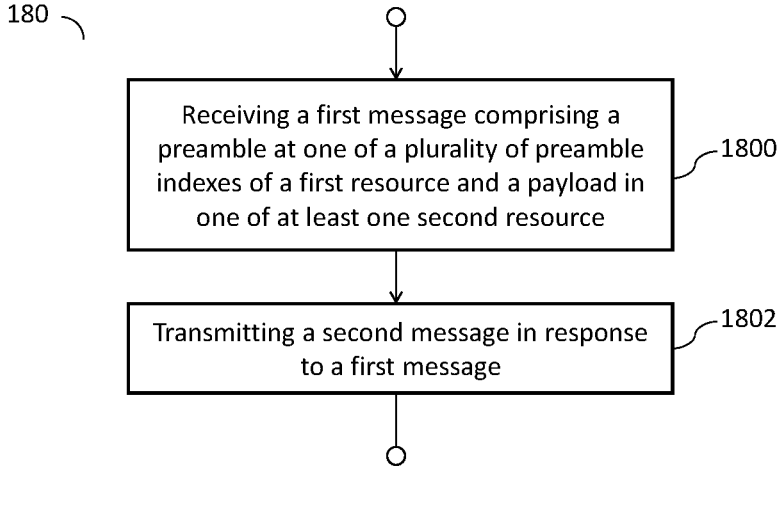

Receiving a first message comprising a preamble at one of a plurality of preamble indexes of a first resource and a payload in one of at least one second resource — 1800

Transmitting a second message in response to a first message — 1802

FIG. 18

METHOD AND APPARATUS FOR RANDOM ACCESS PROCEDURE

PRIORITY

This application claims priority as a Continuation of PCT/CN2019/083288, filed on Apr. 18, 2019, entitled "Method and Apparatus for Random Access Procedure", published as WO 2020/211050 A1, the entire disclosure of which is hereby incorporated by reference.

TECHNICAL FIELD

This application is directed generally to wireless communications, and more particularly, to methods, apparatuses and systems for performing a random access procedure in wireless communications.

BACKGROUND

In both the 4th Generation (4G) and the 5th Generation (5G) new radio (NR) mobile networks, before a user equipment (UE) sends data to a base station (BS), the UE needs to obtain uplink synchronization and downlink synchronization with the BS. The uplink timing synchronization may be achieved by performing a random access procedure.

SUMMARY OF THE INVENTION

An exemplary 4-step random access procedure 10 is shown in FIG. 1. As shown in FIG. 1, a UE 100 transmits a random access channel (RACH) preamble in a message Msg1 to a BS 102. Once the preamble is received successfully by the BS 102, the BS 102 will send a message Msg2 back to the UE 100, in which a medium access control (MAC) random access response (RAR) is included as a response to the preamble. Once the MAC RAR with corresponding random access preamble (RAP) identifier (ID) is received, the UE 100 transmits a message Msg3 to the BS 102 with the grant carried in the MAC RAR. Once the message Msg3 is received, the BS 102 will send a message Msg4 back to the UE 100, in which some kind of contention resolution ID will be included for the purpose of contention resolution. A communication system merely relying on an initial access procedure as mentioned above will induce latency and cannot meet the needs of faster and newer communications in future network developments.

Thus, existing systems and methods for performing a random access procedure in a wireless communication can be improved. The embodiments disclosed herein are directed to solving the issues relating to one or more of the problems presented above, as well as providing additional features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

The present disclosure relates to methods, systems, and devices for random access procedure. The above and other aspects and their implementations are described in greater detail in the drawings, the descriptions, and the claims. The present disclosure relates to a method for a random access procedure, performed by a network device and provided according to an embodiment of the present disclosure. The method includes selecting one of a plurality of preamble indexes of a first resource, and at least one set of the plurality of preamble indexes is mapped to at least one second resource based on a first number of the at least one set of the plurality of preamble indexes and a second number of the at least one second resource; transmitting, to a network node, a first message including a preamble at the selected preamble index of the first resource and a payload in the second resource associated to the selected preamble index; and receiving, from the network node, a second message in response to a first message.

Each of set of the plurality of preamble indexes may comprise at least one preamble index. The network device may include user equipment ("UE"), a mobile phone, a laptop, a tablet computer, an electronic book, and/or a portable computer. The network node may include a base station, a core network, a Mobility Management Entity (MME), a Serving Gateway (S-GW), and/or a Radio Network Controller (RNC). The first resource may be a random access channel occasion. The second resource may be a physical uplink shared channel occasion, a physical uplink shared channel, and/or a physical uplink control channel. At least one preamble index is mapped to one of a plurality of demodulation reference signal port indexes of the associated second resource. A difference between the numbers of preamble indexes in two of the at least one set of preamble indexes is equal to or smaller than 1. The second number may be determined based on a number of synchronization signal blocks per physical random access channel occasion, or based on available time-frequency resources, or based on a number of demodulation reference signal port indexes of each second resource. Each of the at least one set of preamble indexes may be mapped to one second resource when the first number is equal to the second number. The at least one set of preamble indexes may be mapped to the at least one second resource based on at least one ratio parameter when the first number is greater than the second number. The at least one ratio parameter may be determined based on service requirements. The order of the plurality of preamble indexes may increase in code domain. The order of the plurality of preamble indexes may increase in code domain first, frequency domain and then time domain. The order of demodulation reference signal port indexes may increase in code domain, frequency domain and then time domain.

The present disclosure also relates to a method for a random access procedure, performed by a network node and provided according to an embodiment of present disclosure. The method includes receiving, from a network device, a first message including a preamble at one of a plurality of preamble indexes of a first resource and a payload in one of at least one second resource, and at least one set of the plurality of preamble indexes is mapped to the at least one second resource based on a first number of the at least one set of the plurality of preamble indexes and a second number of the at least one second resource; and transmitting, to the network device, a second message in response to the first message.

Each of set of the plurality of preamble indexes comprises at least one preamble index. The network node may be a base station. The second resource may be a physical uplink shared channel occasion. At least one preamble index in at least one set of the plurality of preamble indexes may be mapped to one of a plurality of demodulation reference signal port indexes. A difference between the numbers of preamble indexes in two of the at least one set of preamble indexes may be equal to or smaller than 1. The second number may be determined based on a number of synchronization signal blocks in per physical random access channel occasion. The second number may be determined based on available time-frequency resources, based on a number of demodulation reference signal ports of each second resource, or based on a number of demodulation reference signal port indexes of associated second resource. Each of the at least one set of preamble indexes may be mapped to one second resource when the first number is equal to the second number. The at least one set of preamble indexes may be mapped to the at least one second resource based on at least one ratio parameter when the first number is greater than the second number. The at least one ratio parameter may be determined based on service requirements. The order of the plurality of preamble indexes may increase in code domain, or may increase in code domain first, frequency domain and then time domain. The order of demodulation reference signal port indexes may increase in order of code domain first, frequency domain and then time domain.

The present disclosure relates to a network device including: a processor being configured to select one of a plurality of preamble indexes of a first resource, and at least one set of the plurality of preamble indexes is mapped to at least one second resource based on a first number of the at least one set of the plurality of preamble indexes and a second number of the at least one second resource; a transmitting unit configured to transmit, to a network node, a first message including a preamble at the selected preamble index of the first resource and a payload in the second resource associated to the selected preamble index; and a receiving unit configured to receive, from the network node, a second message in response to a first message. The processor and/or the network device may also include a storage unit having program code stored therein, being configured to, when being executed, cause the processor to perform any of the aforementioned method steps.

The present disclosure relates to a network node including: a receiving unit being configured to receive, from a network device, a first message including a preamble at one of a plurality of preamble indexes of a first resource and a payload in one of at least one second resource, and at least one set of the plurality of preamble indexes is mapped to the at least one second resource based on a first number of the at least one set of the plurality of preamble indexes and a second number of the at least one second resource; and a transmitting unit configured to transmitting, to the network device, a second message in response to the first message. The network node may also include a storage unit having program code stored therein, being configured to, when being executed, cause the network node to perform any of the aforementioned method steps.

The present disclosure also relates to a computer-readable program medium code stored thereupon is disclosed according to an embodiment of the present disclosure, and the code, when executed by a processor, causing the processor to implement a method recited in any of foregoing described methods.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 1 shows an example of a random access procedure.

FIG. 2A shows an example of a schematic diagram of a network device according to an embodiment of the present disclosure.

FIG. 8 shows an example of a mapping between preamble indexes and physical uplink shared channel occasions according to an embodiment of the present disclosure.

FIG. 9 shows an example of a table showing a mapping between preamble indexes and physical uplink shared channel occasions according to an embodiment of the present disclosure.

FIG. 10 shows an example of a mapping between preamble indexes and physical uplink shared channel occasions according to an embodiment of the present disclosure.

FIG. 11 shows an example of a table showing a mapping between preamble indexes and physical uplink shared channel occasions according to an embodiment of the present disclosure.

FIG. 12 shows an example of a mapping between preamble indexes and physical uplink shared channel occasions according to an embodiment of the present disclosure.

FIG. 13 shows an example of a table showing a mapping between preamble indexes and physical uplink shared channel occasions according to an embodiment of the present disclosure.

FIG. 17 shows an example of a flow chart of a process for a network device according to an embodiment of the present disclosure.

FIG. 18 shows an example of a flow chart of a process for a network node according to an embodiment of the present disclosure.

DETAILED DESCRIPTION OF EXEMPLARY EMBODIMENTS

Figure 2B:
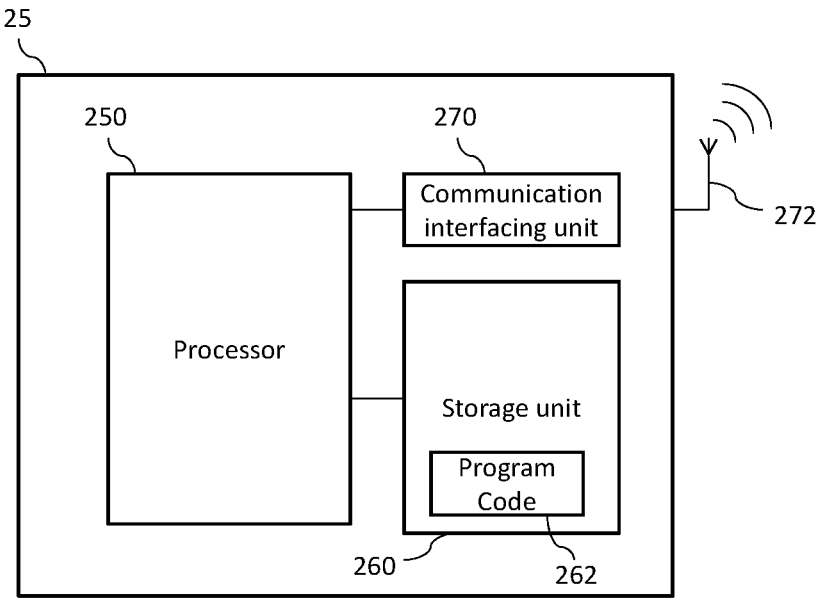
FIG. 2B shows an example of a schematic diagram of a network node according to an embodiment of the present disclosure.

Various exemplary embodiments of the present disclosure are described below with reference to the accompanying figures to enable a skilled person to make and use the present disclosure. As would be apparent to those of ordinary skill in the art, after reading the present disclosure, various changes or modifications to the examples described herein can be made without departing from the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

FIG. 2A relates to a schematic diagram of a network device 20 according to an embodiment of the present disclosure. The network device 20 may be a user equipment (UE), a mobile phone, a laptop, a tablet computer, an electronic book or a portable computer system and is not limited herein. The network device 20 may include a processor 200 such as a microprocessor or Application Specific Integrated Circuit (ASIC), a storage unit 210 and a communication interfacing unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication interfacing unit 220 may a transceiver and is used to transmit and receive signals (e.g. messages or packets) according to processing results of the processor 200. In an embodiment, the communication interfacing unit 220 transmits and receives the signals via an antenna 222 shown in FIG. 2A.

In an embodiment, the storage unit 210 and the program code 212 may be omitted and the processor 200 may include a storage unit with stored program code.

The processor 200 may implement any one of the foregoing described steps on the network device 20.

The communication interfacing unit 220 may be a transceiver. The communication interfacing unit 220 may as an alternative or in addition be combining a transmitting unit and a receiving unit configured to transmit and to receive, respectively, signals to and from a network node (e.g. a BS).

FIG. 2B relates to a schematic diagram of a network node 25 according to an embodiment of the present disclosure. The network node 25 may be a base station (BS), a network entity, a Mobility Management Entity (MME), Serving Gateway (S-GW), Packet Data Network (PDN) Gateway (P-GW), or Radio Network Controller (RNC), and is not limited herein. The network node 25 may include a processor 250 such as a microprocessor or ASIC, a storage unit 260 and a communication interfacing unit 270. The storage unit 260 may be any data storage device that stores a program code 262, which is accessed and executed by the processor 250. Examples of the storage unit 262 include but are not limited to a SIM, ROM, flash memory, RAM, hard-disk, and optical data storage device. The communication interfacing unit 270 may be a transceiver and is used to transmit and receive signals (e.g. messages or packets) according to processing results of the processor 250. In an example, the communication interfacing unit 270 transmits and receives the signals via an antenna 272 shown in FIG. 2B.

In an embodiment, the storage unit 260 and the program code 262 may be omitted the processor 250 may include a storage unit with stored program code.

The processor 250 may implement any steps described in embodiments shown in FIGS. 4 to 16 and 18 on the network node 25.

The communication interfacing unit 270 may be a transceiver. The communication interfacing unit 270 may as an alternative or in addition be combining a transmitting unit and a receiving unit configured to transmit and to receive, respectively, signals to and from a network device (e.g. a UE).

Figure 3:
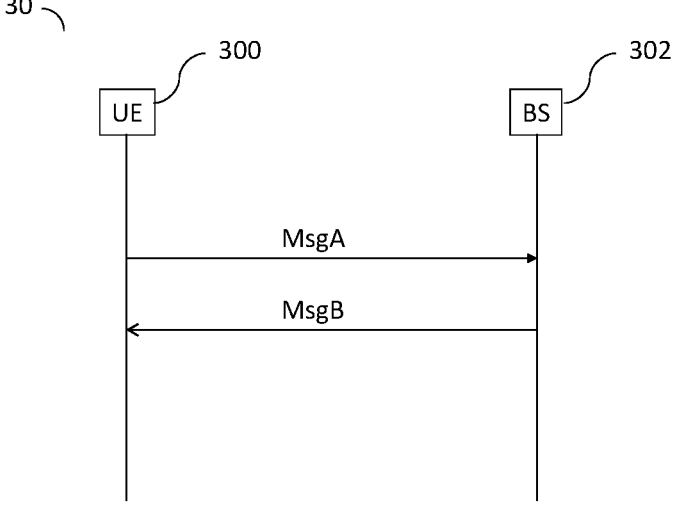
FIG. 3 shows an example of a random access process according to an embodiment of the present disclosure.

FIG. 3 relates to a schematic diagram of a process 30 according to an embodiment of the present disclosure. The process 30 is used for a random access procedure performed by a UE 300 for an access to a BS 302. As shown in FIG. 3, the UE 300 transmits a message MsgA to the BS 302 for the access to the BS 302, and the message MsgA includes a preamble and a corresponded payload. In response to the message MsgA, the BS 302 returns a message MsgB to the UE 300. In an embodiment, the message MsgA includes as least some of the messages Msg1 and Msg3 shown in FIG. 1 and the message MsgB includes at least some of the messages Msg2 and Msg4 shown in FIG. 1. According to FIG. 3, the UE 300 is able to access to the BS 302 via the two-step process 30.

To make the two-step process 30 shown in FIG. 3 more feasible and more beneficial, at least one set of a plurality of preamble indexes in a first resource of transmitting the preamble may be mapped to at least one second resource of transmitting the payload. In an embodiment, each set of the plurality of preamble indexes includes at least one preamble index. That is, each set of the plurality of preamble indexes may include merely one preamble index. In an embodiment, the first resource may be a physical random access (PRACH) occasion and the second resource may be a physical uplink shared channel (PUSCH) occasion. By mapping the at least one set of the plurality of preamble indexes to the at least one second resource, the preamble indexes could be used to indicate the at least one second resource of transmitting the payload. Under such a condition, both the UE 300 and BS 302 are able to determine time/frequency resources of transmitting the payload based on the preamble index of transmitting the corresponded preamble in the message MsgA. As a result, no signal overhead is needed for indicating at least one second resource carrying the corresponded payload. The performance of the wireless communication system is increased, therefore.

In an embodiment, in order to make the two-step process 30 shown in FIG. 3 more feasible and/or more beneficial, at least one set of a plurality of preamble indexes in a first resource of transmitting the preamble may be mapped to at least one second resource of transmitting the payload. In an embodiment, each set of the plurality of preamble indexes includes at least one preamble index. In an embodiment, the first resource may be a plurality of PRACH occasions and the second resource may be a PUSCH occasion. By mapping the at least one set of the plurality of preamble indexes to the at least one second resource, the preamble indexes could be used to indicate the at least one second resource of transmitting the payload. Under such a condition, both the UE 300 and the BS 302 are able to determine time/frequency resources of transmitting the payload based on the preamble index of transmitting the corresponded preamble in the message MsgA. As a result, no signal overhead is needed for allocating the preamble and the at least one second resource carrying the corresponded payload. The performance of the wireless communication system is increased, therefore.

In an embodiment, the mapping between the at least one set of the plurality of preamble indexes and the at least one second resource may be determined based on a first number of the at least one set of the plurality of preamble indexes and a second number of the at least one second resource. In the following descriptions, embodiments of the mapping between the at least one set of the plurality of preamble indexes and the at least one second resource will be shown. In order to simplify illustrations, the following descriptions utilize the PRACH occasion to represent the first resource and utilize the PUSCH occasion as the second resource. However, the skilled person in the art would understand that the first resource and the second resource are not limited to PRACH occasion and PUSCH occasion. For example, the second resource may be a PUSCH or a physical uplink control channel (PUCCH).

Figure 4:
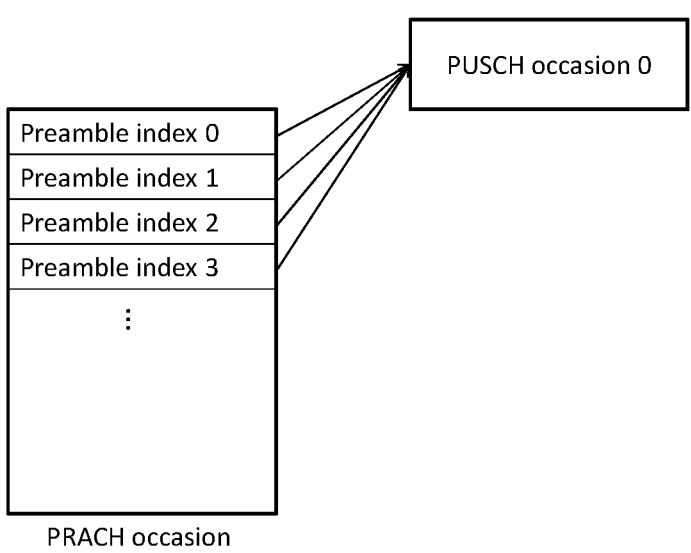
FIG. 4 shows an example of a configuration of preamble indexes and a physical uplink shared channel occasion according to an embodiment of the present disclosure.

FIG. 4 relates to a schematic diagram of a configuration of the preamble indexes and a PUSCH occasion according to an embodiment of the present disclosure. In FIG. 4, the preamble indexes are those in a PRACH occasion and there is a PUSCH occasion with an index 0 (hereinafter, PUSCH occasion 0). The PUSCH occasion 0 is configured at the relative location with respect to the PRACH occasion in time domain and/or frequency domain. For example, a time difference between the PRACH occasion and the PUSCH occasion 0 is a value $\Delta T_0$ and/or a frequency difference between the PRACH occasion and the PUSCH occasion 0 is a value $\Delta F_0$. In this embodiment, there is only one PUSCH occasion. Thus, all of the preamble indexes are mapped to the same PUSCH occasion 0. In other words, one set of preamble indexes of the PRACH occasion is mapped to one PUSCH occasion.

Figure 5:
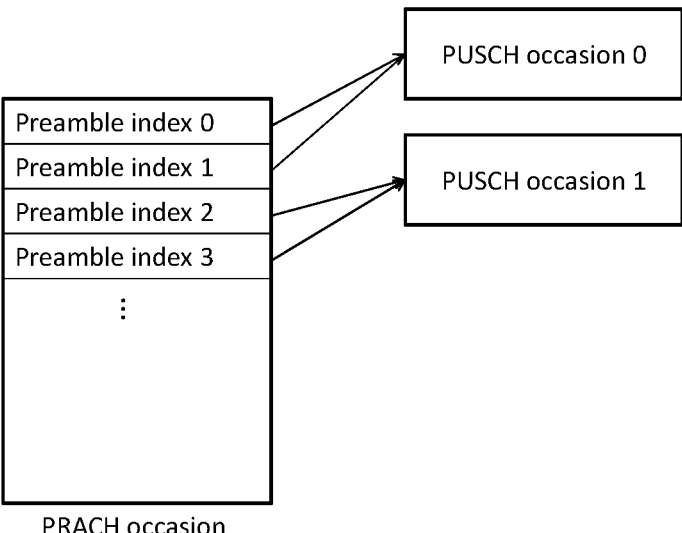
FIG. 5 shows an example of a configuration of preamble indexes and physical uplink shared channel occasions according to an embodiment of the present disclosure.

FIG. 5 relates to a schematic diagram of a configuration of the preamble indexes and two PUSCH occasions according to an embodiment of the present disclosure. In FIG. 5, the preamble indexes are also those in a PRACH occasion and there are two PUSCH occasions with index 0 and index 1 (i.e. PUSCH occasion 0 and PUSCH occasion 1). In an embodiment, the time difference between the PRACH occasion and PUSCH occasion 0 or PUSCH occasion 1 is a value $\Delta T_0$ and the frequency differences between the PRACH occasion and PUSCH occasion 0 and between the PRACH occasion and PUSCH occasion 1 are respectively values $\Delta F_0$ and $\Delta F_1$. In another embodiment, the time differences between the PRACH occasion and PUSCH occasion 0 and between the PRACH occasion and PUSCH occasion 1 are respectively values $\Delta T_0$ and $\Delta T_1$. In other words, the PUSCH occasions can be contiguously configured in time domain or frequency domain.

Note that, the order of the preamble indexes in the PRACH occasion(s) increases in code domain first, frequency domain and then time domain. In the embodiments shown in FIGS. 4 and 5, the order of the preamble indexes in PRACH occasion increase in code domain first, and then frequency domain. Similarly, the order of demodulation reference signal (DMRS) port indexes increases in code domain, frequency domain and then time domain. In an embodiment, X preamble index(es) may indicate a DMRS port index in associated PUSCH occasion. X is a positive integer (e.g. X=1). That is, at least one preamble index may indicate to one DMRS port index. In an embodiment, X can also be a positive integer equal to or less than 8 (i.e. 1<X<8) if available time/frequency resources are limited.

In an embodiment, a DMRS port index indicates a DMRS port number based on a DMRS sequence.

In the embodiment shown in FIG. 5, the preamble indexes of the PRACH occasion are mapped to PUSCH occasion 0 or PUSCH occasion 1. That is, the preamble indexes may be divided into a plurality of sets mapped to a plurality of PUSCH occasions.

Figures 6, 7:
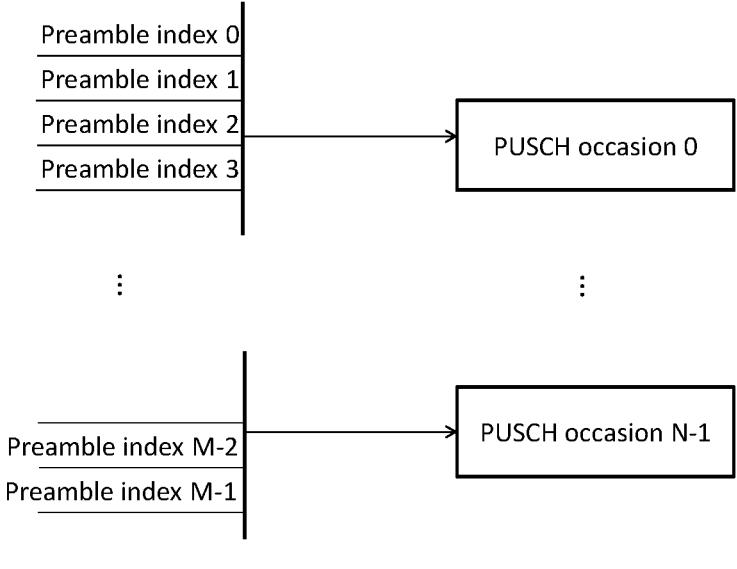
FIG. 6 shows an example of a mapping between preamble indexes and physical uplink shared channel occasions according to an embodiment of the present disclosure.
FIG. 7 shows an example of a mapping between preamble indexes and demodulation reference signal ports according to an embodiment of the present disclosure.

FIG. 6 relates to a schematic diagram of a mapping between preamble indexes 0 to M−1 and PUSCH occasions 0 to N−1. In FIG. 6, the preamble indexes 0 to M−1 are divided into a plurality of sets mapped to the PUSCH occasions with indexes 0 to N−1 (i.e. PUSCH occasions 0 to N−1), where M and N may be positive integers. In an embodiment, a difference between the number of preamble indexes in any two of the plurality sets of preamble indexes is equal to or smaller than 1. In an embodiment, M is 64 when utilizing the PRACH occasion as the first resource. In an embodiment, N is determined based on at least one of a number of synchronization signal blocks (SSB) or Synchronization signal/physical broadcast channel (SS/PBCH) blocks per PRACH occasion, available time-frequency resources and a number of DMRS port indexes of each PUSCH occasion. For example, the minimum value of N may be determined based on the number of SSB or SS/PBCH blocks per PRACH occasion or the number of DMRS port indexes of each PUSCH occasion and the maximum value of N may be determined based on available time-frequency resources and the number of DMRS port indexes of each PUSCH occasion.

In an embodiment, the plurality of preamble indexes may be further mapped to a plurality of DMRS port indexes.

FIG. 7 relates to a schematic diagram of a mapping between the preamble indexes 0 to M−1 and DMRS port indexes 0 to K−1, where M and K may be positive integers. In the embodiment shown in FIG. 7, each of the preamble indexes 0 to N−1 is mapped to one of the DMRS port indexes 0 to K−1. More specifically, the preamble index 0 is mapped to the DMRS port index 0, the preamble index 1 is mapped to the DMRS port index 1, and so on. That is, the order of the preamble indexes indicates the order of the DMRS port indexes. In an embodiment of the number M of preamble indexes is greater than the number K of DMRS port indexes, the order of the DMRS port indexes sequentially mapped to the preamble indexes 0 to M−1 may repeat from 0. For example, if the number M is between the number K and the double of the number K (i.e. K<M<2K), the preamble indexes 0 to K−1 are mapped to the DMRS port indexes 0 to K−1 and the preamble indexes K to M−1 are mapped to the DMRS port indexes 0 to M−K−1.

In an embodiment, a number of the plurality of sets of preamble indexes is equal to the number of the PUSCH occasions and each set of the preamble indexes is mapped to one PUSCH occasion.

FIG. 8 relates to a schematic diagram of an example of the number of the sets of preamble indexes is equal to the number of the PUSCH occasions and is 2. In this embodiment, the preamble indexes 0 to 63 are divided into a first set with the preamble indexes 0 to 31 and a second set with the preamble indexes 32 to 63, which are mapped to the PUSCH occasions 0 and 1, respectively.

Note that, the PUSCH occasions 0 and 1 may be corresponding to different services, such as payload sizes, MCS index types and states of UE.

FIG. 9 relates to a table showing the mapping between the preamble indexes and the PUSCH occasions according to the embodiment shown in FIG. 8. As shown in FIG. 9, the preamble indexes 0 to 63 are divided into 2 sets which include preamble indexes 0 to 31 and 32 to 63, respectively, and are mapped to PUSCH occasion with indexes 0 and 1, respectively. In this embodiment, the PUSCH occasions 0 and 1 are respectively corresponding to payload size types PS_0 and PS_1 (e.g. 52 k bits and 72 k bits) and modulation coding scheme (MCS) index type MCS_0 and MCS 1. The MCS index type may be corresponding to any of MCS types which are potentially used in the wireless communications. In addition, the PRACH occasion and the PUSCH occasions are configured in frequency domain modulation (FDM). That is, a physical resource block (PRB) start position of the PUSCH occasion 0 may be a frequency offset delta_F from the PRACH occasion including the preamble indexes 0 to 63 to the PUSCH occasion 0 and a PRB start position of the PUSCH occasion 1 is a frequency offset $$Num_0^{PRB} + \text{delta\_F}$$

from the PRACH occasion including the preamble indexes 0 to 63 to the PUSCH occasion 1, where $$Num_0^{PRB}$$

is the size of the PUSCH occasion 0 (e.g. 1 PRB, 2 PRB, . . . etc). As shown in FIG. 9, the PRB start positions of the PUSCH occasions 0 and 1 can be expressed as a formula $$f_{preamble\_index}^{start}:$$

$$f_{preamble\_index}^{start} = \begin{cases} \text{delta\_F, if Index\_PO} = 0 & (1) \\ Num_0^{PRB} + \text{delta\_F, if Index\_PO} > 0 \end{cases}$$

$$\text{where, Index\_PO} = \lfloor (\text{preamble index} \div 32) \rfloor + 1 \qquad (2)$$

FIG. 10 relates to a schematic diagram of an example of the number of the plurality of sets of preamble indexes is equal to the number of the PUSCH occasions, in this case the number is 4. In this embodiment, the preamble indexes 0 to 63 are divided into 4 sets which include the preamble indexes 0 to 15, 16 to 31, 32 to 47 and 48 to 63 and are mapped to PUSCH occasions 0, 1, 2 and 3, respectively.

Note that, the PUSCH occasions 0, 1, 2 and 3 are corresponding to different services, such as the payload sizes, the MCS index types and the states of UE.

FIG. 11 relates to a table showing the mapping between the preamble indexes and the PUSCH occasions according to the embodiment of FIG. 10. As shown in FIG. 11, the preamble indexes 0 to 63 are divided into 4 sets which include the preamble indexes 0 to 15, 16 to 31, 32 to 47 and 48 to 63, respectively, and are mapped to PUSCH occasion with indexes 0, 1, 2 and 3, respectively. In this embodiment, the PUSCH occasions with the indexes 0, 1, 2 and 3 are corresponding to payload size types PS_0, PS_1, PS_2 and PS 3, respectively, and MCS index types MCS_0, MSC_1, MSC_2 and MCS_3. In addition, the PUSCH occasions 0, 1, 2 and 3 of this embodiment are configured in FDM. In this embodiment, a PRB start position of the PUSCH occasion 0 is a frequency offset delta_F from the PRACH occasion including the preamble indexes 0 to 63 to the PUSCH occasion 0, a PRB start position of the PUSCH occasion 1 is a frequency offse $$Num_0^{PRB} + \text{delta\_F}$$

from the PRACH occasion including the preamble indexes 0 to 63 to the PUSCH occasion 1, where $$Num_0^{PRB}$$

is the size of PUSCH occasion with the index 0 (e.g. 1 PRB, 2 PRB, . . . etc), and so on. As shown in FIG. 11, the PRB start positions of the PUSCH occasions 0, 1, 2 and 3 can be expressed by a formula $$f_{preamble\_index}^{start}:$$

$$f_{preamble\_index}^{start} = \begin{cases} \text{delta\_F, if Index\_PO} = 0 & (3) \\ \sum_{i=0}^{Index\_PO-1} Num_i^{PRB} + \text{delta\_F, if } Index_{PO} > 0 \end{cases}$$

$$\text{where, } Index_{PO} = \lfloor (\text{preamble index} \div 16) \rfloor + 1 \qquad (4)$$

In an embodiment of one PRACH occasion mapped to a plurality of PUSCH occasions, the order of the preamble indexes in the PRACH occasion increases in code domain and the order of DMRS port indexes increases in code domain, frequency domain and then time domain. In this embodiment, X preamble index(es) may indicate a DMRS port index in associated PUSCH occasion, where X is a positive integer, e.g. X=1. That is, at least one preamble index may indicate a DMRS port index in associated PUSCH occasion. In an embodiment, X can also be an integer equal to or less than 8 if available time-frequency resources are limited. In an embodiment, one PRACH occasion contains P preamble indexes, a plurality of PUSCH occasions contain D DMRS port indexes, where P and D may be positive integers. In this embodiment, X preamble indexes are mapped to a DMRS port index and, e.g., $$X = \lceil P/D \rceil.$$

In an embodiment, non-consequent X preamble indexes are mapped to a DMRS port index. For example, a preamble index i is mapped to DMRS port index j, and preamble index i+D is mapped to DMRS port index j, where i and j may be integers and D may be a positive integer.

In an embodiment of multiple PRACH occasions mapped to multiple PUSCH occasions, the order of the preamble indexes in one PRACH occasion increases in code domain, frequency domain and then time domain. Similarly, the order of DMRS port indexes increases in code domain, frequency domain and then time domain. In this embodiment, X preamble index(es) may indicate a DMRS port index in associated PUSCH occasion, where X is positive integers (e.g. X=1). That is, at least one preamble index may indicate a DMRS port index in associated PUSCH occasion. In an embodiment, X can also be an integer equal to or less than 8 if available time-frequency resources are limited.

In an embodiment, N_ro PRACH occasions contain N_ro*P preamble indexes, a plurality of PUSCH occasions contain D DMRS port indexes, where N_ro, P and D may be positive integers, N_ro being the number of PRACH occasion(s) with "ro" being an abbreviation of PRACH occasions. Under such a condition, X preamble indexes are mapped to a DMRS port index and, e.g., $$X = \lceil N\_ro * P/D \rceil.$$

In an embodiment, the plurality of sets is mapped to the plurality of second resources based on at least one ratio parameter when the number of the plurality of sets of preamble indexes are greater than the number of the plurality of second resources. The at least one ratio parameter is between 0 and 1 and indicates at least one percentage of dividing the plurality of sets of preamble indexes. In an embodiment, the at least one ratio parameter is determined based on service requirements of the wireless communications.

FIG. 12 relates to a schematic diagram of an embodiment of the number of the plurality of sets of preamble indexes is 4 and the number of the plurality of PUSCH occasions is 2. In this embodiment, the preamble indexes 0 to 63 are divided into 4 sets including the preamble indexes 0 to 15, 16 to 31, 32 to 47 and 48 to 63, respectively. Because the number of the sets of preamble indexes is greater than the number of the PUSCH occasions, there is a ratio parameter α for dividing the plurality of sets into 2 parts which are respectively mapped to the PUSCH occasions 0 and 1. In this embodiment, the ratio parameter α=¾. That is, 4 sets of preamble indexes are divided at 75% of the sets of the preambles. Thus, a first divided part includes first 3 (i.e. α×4) sets of preamble indexes and a second divided part accordingly has the remaining 1 set of the preamble indexes. As shown in FIG. 12, the first part with the first 3 sets is mapped to the PUSCH occasion 0 and the second part with the remaining 1 set is mapped to the PUSCH occasion 1.

Note that, the ratio parameter α of the embodiment shown in FIG. 12 may be determined based on the service requirements of the wireless communications. For embodiment, the PUSCH occasions 0 and 1 may correspond to different services of payload sizes 56 k bits and 72 k bits, respectively and the service requirements of the wireless communications need more services of the payload size 56 k bits than those of the payload size 72 k bits. Thus, the ratio parameter α is set to ¾, to map more preamble indexes to the PUSCH occasion 0 corresponding to the service of the payload size 56 k bits.

FIG. 13 relates to a table showing the mapping between the preamble indexes and the PUSCH occasions according to the embodiment of FIG. 12. As shown in FIG. 13, the first 3 sets of the preamble indexes are mapped to PUSCH occasion of the index 0 and the remaining 1 set of the preamble indexes are mapped to PUSCH occasion of the index 1. In FIG. 13, the PUSCH occasions of the indexes 0 and 1 are respectively corresponding to payload size types PS_0 and PS_1 and MCS index types MCS_0 and MCS_1. In addition, the PRACH occasions 0 and 1 are configured in FDM. As shown in FIG. 13, a PRB start position of the PUSCH occasion 0 is a frequency offset delta_F from the PRACH occasion including the preamble indexes 0 to 63 to the PUSCH occasion 0 and a PRB start position of the PUSCH occasion 1 is a frequency offset $$Num_0^{PRB} + delta\_F$$

from the PRACH occasion including the preamble indexes 0 to 63 to the PUSCH occasion 1, where $$Num_0^{PRB}$$

is the size of PUSCH occasion 0. As shown in FIG. 13, the PRB start positions of the PUSCH occasions 0 and 1 also can be expressed by a formula $$f_{preamble\_index}^{start} : \qquad (5)$$

$$f_{preamble\_index}^{start} = \begin{cases} delta\_F, & if\ Index\_PO = 0 \\ Num_0^{PRB} + delta\_F, & if\ Index\_PO > 0 \end{cases}$$

In an embodiment the Index PO in formula (5) can be expressed as:

$$Index\_PO = \begin{cases} 0, & \lfloor (preamble\ index \div 16) \rfloor + 1 \le \alpha \times 4 \qquad (6) \\ 1, & else \end{cases}$$

In another embodiment, the Index PO in formula (5) can be expressed as:

$$Index\_PO = \left\lceil \frac{\lfloor (preamble\ index \div 16) \rfloor + 1}{4} - \alpha \right\rceil \qquad (7)$$

Figure 14:
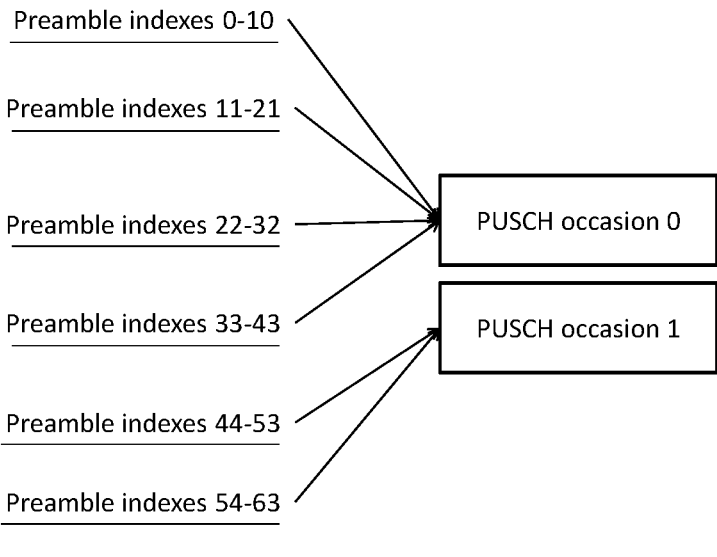
FIG. 14 shows an example of a mapping between preamble indexes and physical uplink shared channel occasions according to an embodiment of the present disclosure.

FIG. 14 relates to a schematic diagram of an embodiment of the number of the plurality of sets of preamble indexes is 6 and the number of the plurality of PUSCH occasions is 2. In this embodiment, the preamble indexes 0 to 63 are divided into 6 sets including the preamble indexes 0 to 10, 11 to 21, 22 to 32, 33 to 43, 44 to 53 and 54 to 63, respectively. Similar to the embodiment of FIG. 12, there is one ratio parameter α=⅙ and 6 sets of the preamble indexes are divided at ⅙ of the sets of preamble indexes. Under such a condition, the first divided part mapped to the PUSCH occasion 0 includes first 4 (i.e. α×6) sets of preamble indexes and the second divided part mapped to the PUSCH occasion 1 includes the remaining 2 sets of the preamble indexes.

Figure 15:
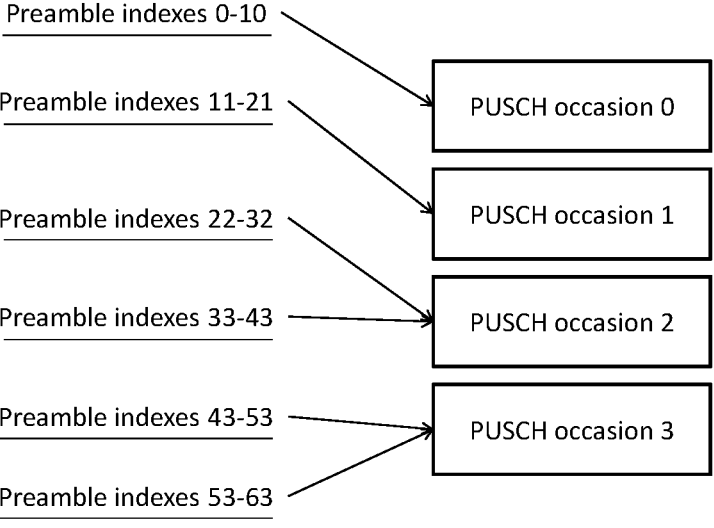
FIG. 15 shows an example of a mapping between preamble indexes and physical uplink shared channel occasions according to an embodiment of the present disclosure.

FIG. 15 relates to a schematic diagram of an embodiment of the number of the plurality of sets of preamble indexes is 6 and the number of the plurality of PUSCH occasions is 4. Similar to the embodiment shown in FIG. 14, the preamble indexes 0 to 63 are divided into 6 sets including the preamble indexes 0 to 10, 11 to 21, 22 to 32, 33 to 43, 44 to 53 and 54 to 63, respectively. In this embodiment, there is 3 ratio parameters α1, α2 and α3, where $\alpha_1=\frac{1}{6}$, $\alpha_2=\frac{2}{6}$, $\alpha_3=\frac{4}{6}$. That is, the 6 sets of the preamble indexes are divided at $\frac{1}{6}$, $\frac{2}{6}$ and $\frac{4}{6}$ of the sets of preamble indexes. Under such a condition, a first divided part includes $0 \sim \frac{1}{6}$ of the 6 sets of preamble indexes, a second divided part includes $\frac{1}{6} \sim \frac{2}{6}$ of the 6 sets of preamble indexes, a third divided part includes $\frac{2}{6} \sim \frac{4}{6}$ of the 6 sets of preamble indexes and a fourth divided part includes remaining sets of the preamble indexes. As shown in FIG. 15, the first divided part mapped to the PUSCH occasion 0 includes the first 1 set, the second divided part mapped to the PUSCH occasion 1 includes the subsequent 1 set of preamble indexes, the third part mapped to the PUSCH occasion 2 includes the subsequent 2 sets of preamble indexes and the fourth part mapped to the PUSCH occasion 3 includes the remaining 2 sets of preamble indexes.

In an embodiment, the preamble indexes 0 to 63 are divided into 64 sets. That is, each set includes one preamble index. In this embodiment, 64 sets are mapped to 4 PUSCH occasions 0, 1, 2 and 3 based on 3 ratio parameters α1, α2 and α3, where $\alpha_1=\frac{1}{8}$, $\alpha_2=\frac{2}{8}$, $\alpha_3=\frac{4}{8}$. Under such a condition, the first 8 sets (i.e. the preamble indexes 0 to 7) are mapped to the PUSCH occasion 0, the subsequent 8 sets (i.e. the preamble indexes 8 to 15) are mapped to the PUSCH occasion 1, the subsequent 16 sets (i.e. the preamble indexes 16 to 31) are mapped to the PUSCH occasion 2, and the remaining 32 sets (i.e. the preamble indexes 32 to 63) are mapped to the PUSCH occasion 3.

In an embodiment, when the number of the plurality of PUSCH occasions (i.e. second resources) is greater than a threshold (e.g. 6), each set of preamble indexes can be mapped to multiple second resources. When the number of the plurality of PUSCH occasions exceeds the threshold, it may not be practical to use the preamble indexes to indicate the services (e.g. a payload size and a MCS type) of each second resource. Under such a condition, the services of each second resource may be indicated by other resources (e.g. uplink control information (UCI) of the PUSCH) when the number of the plurality of PUSCH occasions exceeds the threshold.

Figure 16A:
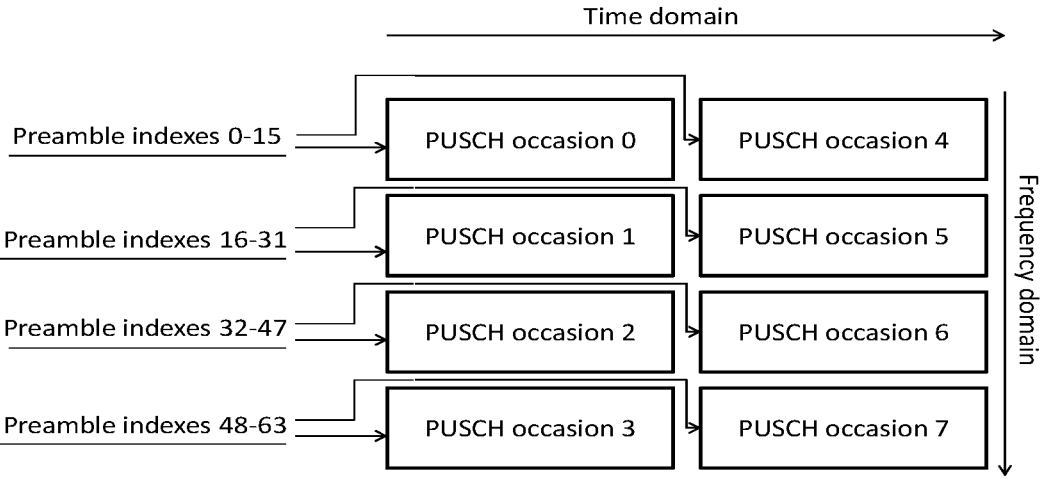
FIG. 16A shows an example of a mapping between preamble indexes and physical uplink shared channel occasions according to an embodiment of the present disclosure.

FIG. 16A relates to a schematic diagram of a mapping between 4 sets of preamble indexes and 8 PUSCH occasions according to an embodiment of the present disclosure. As shown in FIG. 16A, each of the 4 sets of preamble indexes are mapped to 2 PUSCH occasions since the number of the PUSCH occasions is greater than 6 (i.e. the threshold). In this embodiment, the PUSCH occasions 0 to 7 are configured in both time domain and frequency domain. More specifically, relations among the PUSCH occasions 0 to 3 or 4 to 7 are frequency offsets and relation between the PUSCH occasions 0 to 3 and 4 to 7 is a time offset.

Figure 16B:
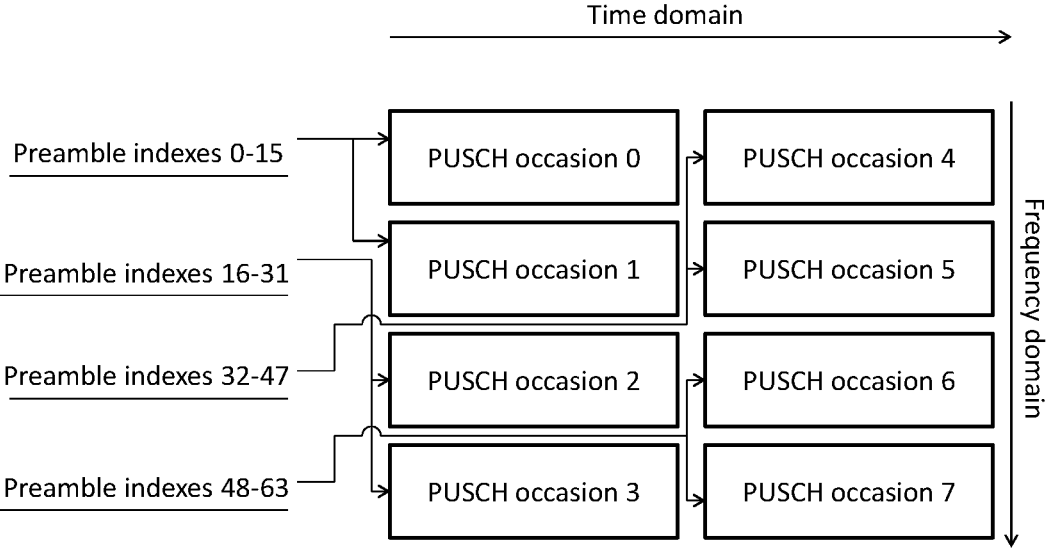
FIG. 16B shows an example of a mapping between preamble indexes and physical uplink shared channel occasions according to an embodiment of the present disclosure.

FIG. 16B relates to a schematic diagram of a mapping between 4 sets of preamble indexes and 8 PUSCH occasions according to an embodiment of the present disclosure. Similar to FIG. 16A, each of the 4 sets of preamble indexes are mapped to 2 PUSCH occasions since the number of the PUSCH occasions is greater than 6 (i.e. the threshold). In this embodiment, the PUSCH occasions 0 to 7 are also configured in both time domain and frequency domain. More specifically, the index order of PUSCH occasions 0 to 7 increases first in frequency domain and then in time domain. Different from FIG. 16A, the set of preamble indexes 0 to 15 changes to be mapped to PUSCH occasion 0 and 1, the subsequent set of preamble indexes 16 to 31 changes to be mapped to PUSCH occasion 2 and 3, and so on. In other words, 4 sets of preamble indexes 0 to 63 are mapped to the PUSCH occasions 0 to 7 in a sequential order of the index numbers of the PUSCH occasions 0 to 7.

FIG. 17 relates to a flow chart of a process 170 according to an embodiment of the present disclosure. The process 170 may be executed by a network device (e.g. a UE) for performing a random access procedure and for an access to a network node (e.g. a BS). In an example, the process 170 may be compiled into the program code 212 executed by the processor 200 shown in FIG. 2A. In another example, the storage unit 210 and the program code 212 may be omitted and the processor 200 is configured to perform any of steps in the process 170. In the process 170, the network device first selects a preamble index from a plurality of preamble indexes of a first resource before accessing to the network node. In an embodiment, the first resource is a PRACH occasion or a RACH occasion. Note that, at least one set of the plurality preamble indexes is mapped to at least one second resource utilized for transmitting payload. The details of the mapping between the at least one set of the plurality preamble indexes and the at least one second resource can be referred to any of embodiments shown in FIGS. 4 to 16. Under such a condition, once the preamble index is selected, the at least one second resource utilized for transmitting the corresponded payload is determined (Step 1700). In an embodiment, the second resource may be a PUSCH occasion. Next, the network device transmits a first message to the network node for an access to the network node, and the first message includes a preamble at the selected preamble index of the first resource and a payload at the at least one second resource associated to the selected preamble index (step 1702). In response to the first message, the network node returns a second message to the network device (Step 1704). The first message and the second message of FIG. 17 may be the messages MsgA and MsgB shown in FIG. 3. By adopting the process 170, the network device is able to execute the random access procedure by 2-step process 30 shown in FIG. 3. Furthermore, the network device is able to determine the wireless resources (e.g. time/frequency resources) of transmitting the payload once the preamble index is selected because of the mapping between the at least one set of the plurality preamble indexes of the first resource and the at least one second resource. Therefore, no signal overhead is needed for allocating the preamble and the at least one second resource carrying the corresponded payload and the performance of the network device is improved.

FIG. 18 relates to a flow chart of a process 180 according to an embodiment of the present disclosure. The process 180 may be executed by a network node (e.g. a BS) for performing a random access procedure with a network device (e.g. a UE). In an example, the process 180 may be compiled into the program code 262 executed by the processor 250 shown in FIG. 2B. In another example, the storage unit 260 and the program code 262 may be omitted and the processor 250 is configured to perform any of steps in the process 180. As shown in FIG. 18, the network node receives a first message including a preamble at one of a plurality of preamble indexes of a first resource and a payload in one of at least one second resource (step 1800). In an embodiment, the first resource is a PRACH occasion or a RACH occasion and the second resource is a PUSCH occasion. In this embodiment, at least one set of the preamble indexes of the first resource is mapped to the at least one second resource. The details of the mapping between the at least one set of the preamble indexes of the first resource and the at least one second resource can be referred to the embodiments shown in FIGS. 4 to 16. Next, the network node transmits a second message in response to the first message (step 1802). The first message and the second message shown in FIG. 18 may be the messages MsgA and MsgB shown in FIG. 3. According to the process 180, the network node is able to perform the random access procedure by the 2-step process 30 shown in FIG. 3. Moreover, the preamble indexes are utilized to indicate the second resource of carrying the corresponded payload. As a result, the network node is able to allocate the at least one second resource carrying the corresponded payload based on the preamble index of the received preamble. Thus, additional signaling for allocating the preamble and the at least one second resource carrying the corresponded payload is not needed. The performance of the network node is therefore improved.

In other words, the at least one set of the preamble indexes of the first resource is mapped to at least one second resource carrying the corresponded payload when performing the 2-step random access procedure. As a result, there is no need for additional signaling of allocating the preamble and the resources carrying the corresponded payload. The performance of the random access procedure is improved and may meet the needs of faster and newer communications in future network developments.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method for a random access procedure, performed by a user equipment, the method comprising:
  selecting one of a plurality of preamble indexes of a physical random access channel occasion, wherein at least one set of the plurality of preamble indexes is mapped to at least one physical uplink shared channel occasion based on a first number of the at least one set of the plurality of preamble indexes and a second number of the at least one physical uplink shared channel occasion, wherein X preamble index or indexes is/are mapped to a demodulation reference signal port index of an associated physical uplink shared channel occasion, with:

$$X = \lceil N\_ro * P/D \rceil,$$

where N_ro represents a number of at least one PRACH occasion, P represents a number of preamble index(es), D represents a number of demodulation reference signal port index(es) of at least one PUSCH occasion, and where X, N_ro, P and D are positive integers, wherein a DRMS port index indicates a DMRS port number based on a DMRS sequence;
  transmitting, to a network node, a first message comprising a preamble with the selected preamble index of the physical random access channel occasion and a payload in the at least one physical uplink shared channel occasion associated to the selected preamble index; and
  receiving, from the network node, a second message in response to the first message,
  wherein the at least one set of the plurality of preamble indexes is mapped to a plurality of physical uplink shared channel occasions, wherein indexes of the plurality of PUSCH occasions increases first in frequency domain and then second in time domain,
  wherein the order of the X preamble indexes increases in code domain first, frequency domain, and then time domain, and wherein the at least one set of preamble indexes is mapped to the at least one physical uplink shared channel occasion based on at least one ratio parameter when the first number is greater than the second number, wherein the at least one ratio parameter is determined based on service requirements.

2. The method of claim 1, wherein a difference between the numbers of preamble indexes in two of the at least one set of preamble indexes is equal to or smaller than 1.

3. The method of claim 1, wherein the second number is determined based on a number of synchronization signal blocks per physical random access channel occasion or based on available time-frequency resources or based on a number of demodulation reference signal port indexes of each physical uplink shared channel occasion.

4. The method of claim 1, wherein each of the at least one set of preamble indexes is mapped to one physical uplink shared channel occasion when the first number is equal to the second number.

5. The method of claim 1, wherein X preamble indexes are mapped to demodulation reference signal port indexes and wherein the order of demodulation reference signal port indexes increases in code domain, frequency domain and then time domain.

6. A method for a random access procedure, performed by a base station, the method comprising:
  receiving, from a network device, a first message comprising a preamble at one of a plurality of preamble indexes of a physical random access channel occasion and a payload in one of at least one physical uplink shared channel occasion, wherein at least one set of the plurality of preamble indexes is mapped to the at least one physical uplink shared channel occasion based on a first number of the at least one set of the plurality of preamble indexes and a second number of the at least one second physical uplink shared channel occasion, wherein X preamble index or indexes is/are mapped to a demodulation reference signal port index of an associated physical uplink shared channel occasion, with:

$$X = \lceil N\_ro * P/D \rceil,$$

where N_ro represents a number of at least one PRACH occasion, P represents a number of preamble index(es), D represents a number of demodulation reference signal port index(es) of at least one PUSCH occasion, and where X, N_ro, P and D are positive integers, wherein a DRMS port index indicates a DMRS port number based on a DMRS sequence; and
  transmitting, to the network device, a second message in response to the first message,
  wherein the at least one set of the plurality of preamble indexes is mapped to a plurality of physical uplink shared channel occasions, wherein indexes of the plurality of PUSCH occasions increases first in frequency domain and then second in time domain,
  wherein the order of the X preamble indexes increases in code domain first, frequency domain, and then time domain, and
  wherein the at least one set of preamble indexes is mapped to the at least one physical uplink shared channel occasion based on at least one ratio parameter when the first number is greater than the second number, wherein the at least one ratio parameter is determined based on service requirements.

7. The method of claim 6, wherein a difference between the numbers of preamble indexes in two of the at least one set of preamble indexes is equal to or smaller than 1.

8. The method of claim 6, wherein the second number is determined based on a number of synchronization signal blocks per physical random access channel occasion or based on available time-frequency resources or based on a number of demodulation reference signal port indexes of each physical uplink shared channel occasion.

9. The method of claim 6, wherein each of the at least one set of preamble indexes is mapped to one physical uplink shared channel occasion when the first number is equal to the second number.

10. The method of claim 6, wherein X preamble indexes are mapped to demodulation reference signal port indexes and wherein the order of demodulation reference signal port indexes increases in code domain, frequency domain and then time domain.

11. A user equipment comprising a processor and a storage unit, wherein the processor is configured to read a program code from the storage unit and implement:

selecting one of a plurality of preamble indexes of a physical random access channel occasion, wherein at least one set of the plurality of preamble indexes is mapped to at least one physical uplink shared channel occasion based on a first number of the at least one set of the plurality of preamble indexes and a second number of the at least one physical uplink shared channel occasion, wherein X preamble index or indexes is/are mapped to a demodulation reference signal port index of an associated physical uplink shared channel occasion, with:

$$X = \lceil \mathrm{N\_ro} * P/D \rceil,$$

where N_ro represents a number of at least one PRACH occasion, P represents a number of preamble index(es), D represents a number of demodulation reference signal port index(es) of at least one PUSCH occasion, and where X, N_ro, P and D are positive integers, wherein a DRMS port index indicates a DMRS port number based on a DMRS sequence;

transmitting, to a network node, a first message comprising a preamble with the selected preamble index of the physical random access channel occasion and a payload in the at least one physical uplink shared channel occasion associated to the selected preamble index; and receiving, from the network node, a second message in response to the first message, wherein the at least one set of the plurality of preamble indexes is mapped to a plurality of physical uplink shared channel occasions, wherein indexes of the plurality of PUSCH occasions increases first in frequency domain and then second in time domain, wherein the order of the X preamble indexes increases in code domain first, frequency domain, and then time domain, and wherein the at least one set of preamble indexes is mapped to the at least one physical uplink shared channel occasion based on at least one ratio parameter when the first number is greater than the second number, wherein the at least one ratio parameter is determined based on service requirements.

12. A base station comprising a processor and a storage unit, wherein the processor is configured to read a program code from the storage unit and implement:

receiving, from a network device, a first message comprising a preamble at one of a plurality of preamble indexes of a physical random access channel occasion and a payload in one of at least one physical uplink shared channel occasion, wherein at least one set of the plurality of preamble indexes is mapped to the at least one physical uplink shared channel occasion based on a first number of the at least one set of the plurality of preamble indexes and a second number of the at least one second physical uplink shared channel occasion, wherein X preamble index or indexes is/are mapped to a demodulation reference signal port index of an associated physical uplink shared channel occasion, with:

$$X = \lceil \mathrm{N\_ro} * P/D \rceil,$$

where N_ro represents a number of at least one PRACH occasion, P represents a number of preamble index(es), D represents a number of demodulation reference signal port index(es) of at least one PUSCH occasion, and where X, N_ro, P and D are positive integers, wherein a DRMS port index indicates a DMRS port number based on a DMRS sequence; and transmitting, to the network device, a second message in response to the first message, wherein the at least one set of the plurality of preamble indexes is mapped to a plurality of physical uplink shared channel occasions, wherein indexes of the plurality of PUSCH occasions increases first in frequency domain and then second in time domain, wherein the order of the X preamble indexes increases in code domain first, frequency domain, and then time domain, and wherein the at least one set of preamble indexes is mapped to the at least one physical uplink shared channel occasion based on at least one ratio parameter when the first number is greater than the second number, wherein the at least one ratio parameter is determined based on service requirements.

* * * * *